C. V. SHILLINGER.
BOAT PROPELLER.
APPLICATION FILED MAY 26, 1911.
1,047,999.
Patented Dec. 24, 1912.
2 SHEETS—SHEET 2.
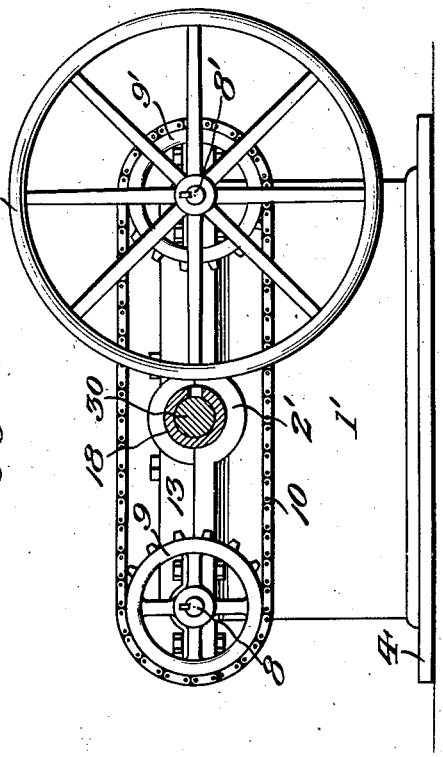
Witnesses
Edwin G. McKee
A. B. Farnham
Inventor
Clement V. Shillinger
By Geo. W. Sues
Attorney

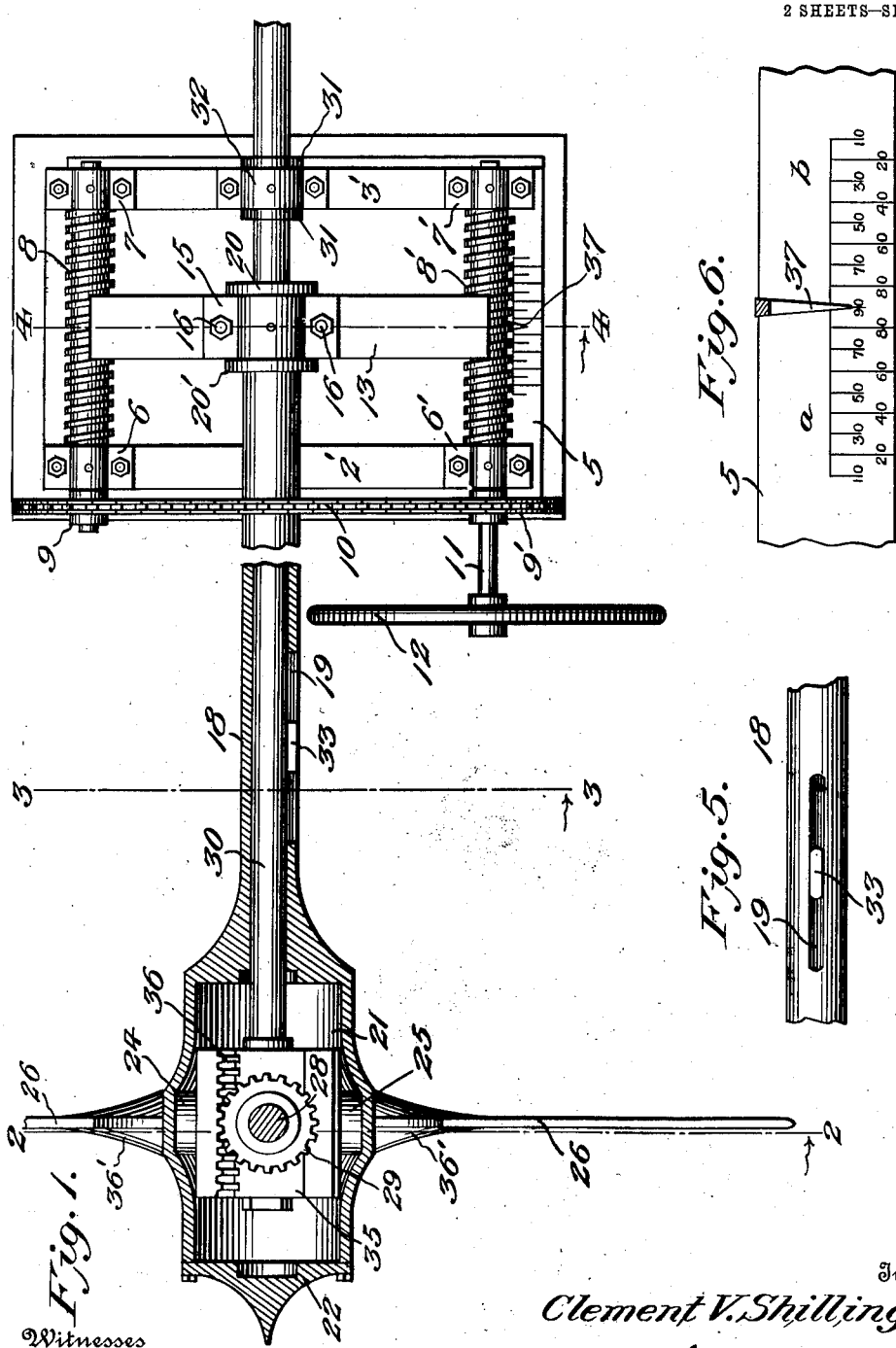

UNITED STATES PATENT OFFICE.

CLEMENT V. SHILLINGER, OF KINGSBURY, INDIANA.

BOAT-PROPELLER.

1,047,999.  Specification of Letters Patent.  Patented Dec. 24, 1912.

Application filed May 26, 1911. Serial No. 629,708.

*To all whom it may concern:*

Be it known that I, CLEMENT V. SHILLINGER, a citizen of the United States, and a resident of Kingsbury, in the county of Laporte and State of Indiana, have invented certain new and useful Improvements in Boat-Propellers, of which the following is a specification, reference being had to the accompanying drawings.

This invention has relation to an improved propeller used in connection with power propelled vessels; and the object of my invention is to provide a device of this general character of a compact and durable construction, including a plurality of adjustably held propeller blades which are capable of accurate synchronous adjustment at any desired angle either backward or forward, relative to the axis of the drive shaft, and my invention further includes a means indicating at all times the exact angle at which each blade is set.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification, and in which like numerals of reference indicate similar parts in the several views: Figure 1, is a top view, partly in section and with parts broken away, of my invention. Fig. 2, is a sectional end view of the rack head. Fig. 3, is a section on line 3—3 of Fig. 1. Fig. 4, is a sectional view through the yoke. Fig. 5, shows a fragmentary portion of the shafts, showing the position of the stud, and Fig. 6, is a detached detail showing the scale and indicator used in my invention.

In my present invention I provide a vessel propeller having blades which can be accurately adjusted, so that they will subtend a plane extending at right angles to the axis of the driving shaft at any desired angle, either forward or backward, so that as the speed of the driving shaft is increased or diminished, the angle of the propeller blades can be correspondingly changed.

In the accompanying drawings I have shown a rectangular supporting frame comprising the two similar end members 1 and 1', and the side members 2 and 3, these members forming a support having the base flange 4, and the upper side flange 2' and 3', and the end flange 5, as clearly shown. Secured to the ends of the side flanges 2' and 3', are the oppositely positioned sets of bearings 6, 6', and 7 and 7', the bearings being fixed in spaced relation. Revolubly held within the bearings 6 and 7, is the driven worm 8, while revolubly held within the bearings 6' and 7', is the driving worm 8', these worms being held in parallel spaced relation, as shown in Fig. 1. Secured to one end of the worm shaft 8, is a chain gear 9, while secured to the worm shaft 8', is a counterpart chain gear 9', a chain 10, connecting these two gears.

As shown in Fig. 1, the worm shaft 8', is provided with a shaft extension 11, giving support to the hand wheel 12, by means of which these worm shafts 8 and 8', are synchronously rotated in like directions. Held between the worm shafts 8 and 8', is a yoke bar 13, which at its ends, as shown in Fig. 4, is provided with the semi-cylindrical worm seats 14 and 14', arranged for co-action with the worm shafts 8 and 8'. This yoke bar 13, is provided with a centrally positioned aperture serving as a bearing, the upper portion of the yoke bar having a seat to receive the upper bearing plate 15, as shown in Fig. 4, which is secured by means of suitable bolts 16. Revolubly held within this yoke bearing is the tubular shaft 18, having the lengthwise running slot 19, this shaft having the stop collars 20 and 20', engaging the yoke bar 13, as shown in Fig. 1, to prevent any longitudinal displacement of this tubular shaft, which ends in the enlarged tubular hut or hollow hub 21, the outer open end of which is closed by means of the cap 22. As shown in Figs. 1 and 2, this hut is provided with a plurality of laterally extending bearing bosses marked 23, 24 and 25, in the drawings, these bosses being disposed in spaced relation and located intermediate of the ends of the hut. This hut where it extends through the rear of the vessel, in connection with which it is used, is provided with a suitable bearing support, which has not been shown in the drawings. Revolubly held within each bearing boss, is the bearing collar of a propeller blade 26, each propeller blade ending in a pinion stem 28, to which is securely fixed a pinion 29, as is shown in Fig. 2. Each pinion is held to its stem by means of a suitable nut. In the drawings a propeller with three blades is shown. Revolubly held within the tubular shaft 18, is the drive shaft 30, which is given support at the end projecting beyond the tubular shaft 18, within a suitable bearing 32. This shaft 30, is held against any lengthwise or longitudinal displacement by means of the stop collars 31, shown in Fig. 1. Extending from the drive shaft 30, is a key 33, snugly and slidably held within the slot 19, of the tubular shaft 18, as shown in Fig. 5.

As shown in Fig. 1, the drive shaft 30, ends within the hut 21, and secured to this end of the drive shaft is a head 35, approximately triangular in cross section, provided with a plurality of radially extending webs 36, each web forming a rack in being provided upon one side with a plurality of outstanding rack teeth, there being one rack for each blade pinion, as clearly shown in Fig. 2.

Each blade 26, is provided with an enlargement 36' serving as a stop to accurately determine the position of each blade relative to the hut.

Extending from the yoke 13, as shown in Fig. 4, is an indicator 37, which travels with the yoke and is arranged to pass over a scale graduation, attached to one of the upper flanges 5. This scale includes a determining or base unit, in this instance being marked 90, and extending in opposite direction in decreasing ratios, as clearly shown in Fig. 6. The instrumentalities are so arranged that when the index 37, registers with the determining unit 90, as shown in Fig. 6, every propeller blade 26, will extend in a plane 90 degrees to the axis of the drive shaft 30. In actuating the yoke 13, so that the indicator will travel toward the end of the scale marked a, the propeller blades 26, will all be tilted in one direction, say at 80, 70 or 60 degrees to the axis of the shaft, while when the index 37, is carried toward the end of the graduation mark b, the blades will all be simultaneously tilted in an opposite direction, the scale graduation at all times accurately disclosing at what angle the blades are set, and disclosing also whether the blades are set forward or backward. In giving position to the blades 26, the operator rotates the driving worm 8', resulting in the opposite shaft 8, being synchronously rotated, so that the yoke 13, will carry in the desired direction to accurately determine the exact angle of these blades.

The practical utility of my device may be illustrated by the following: Assuming a boat propeller to revolve 800 revolutions per minute, with the blades standing at an angle of fifty degrees, will give a speed, say, of 25 knots. In changing the blades to an angle, say of 42 degrees while revolving at the same rate, will result in a greater pressure behind the blades so that the speed of the vessel will be very materially increased. By means of my propeller further, a boat may be started very much quicker. For example, the blades standing at 45 degrees will not have the water pressure behind them that a propeller will have with fans standing at 75 degrees with the same revolutions. Under these conditions, as the boat gains in speed, the propeller with the blades at 75 degrees loses its water pressure behind the blade, whereas, by changing the angle of the fans to a less degree, the pressure behind the fans is again increased, resulting in an increased speed. The less degree of blades, the more lead they will have, giving the boat greater speed. As stated, in Fig. 1, the blades are shown as standing at 90 degrees, or at right angles with the possibility of being tilted backward and forward to fifteen degrees.

From the foregoing it will be seen that the excursion of the tubular shaft tilts the blades in one direction, while its incursion tilts the blades in an opposite direction. It is of course understood that the tubular shaft 18, revolves with the drive shaft 30, the key 33, serving to connect the two shafts, though the tubular sleeve 18, would revolve without this key by means of the head 35, being in contact with the blades 26, carried by the hut 21.

A propeller constructed according to my invention is extremely simple and comparatively inexpensive in construction when the great advantages derived therefrom are considered. The device is further durable and efficient in operation and the change of position of blades, either forward or backward, can be accomplished with ease, accuracy and despatch. It is of course understood that propellers embodying my invention may be made in various sizes.

While I have shown the hut 21, as forming an integral part of the tubular shaft 18, it is of course understood that the same can be made separate and be secured to the shaft by any suitable means; so also should it be understood that a shaft and pinions could be employed instead of the chain and chain gears to synchronously actuate the worm shafts 8 and 8'.

Having thus described my said invention, what I claim as new and desire to secure by United States Letters Patent is:

In coöperative combination, a supporting frame having oppositely positioned sets of bearings, a driving worm within one set of bearings, a driven worm within the remaining set of bearings, a chain gear upon each of said worms, a chain passing over said gears, a yoke bar having its ends threaded and in engagement with said worms, said yoke bar having a centrally positioned bearing opening, a slotted tubular shaft revolubly secured within said opening having an enlarged hollow tubular hub with laterally extending bearing bosses, a propeller blade having a bearing collar held within each boss, a pinion secured to the inner end of each blade, a driving shaft revolubly held within said tubular shaft and ending within said hollow hub, a key extending from said driving shaft and slidably held within the slot of said tubular shaft and a head having rack teeth secured to the end of said driving shaft said teeth engaging said pinions, as and in the manner disclosed.

In testimony whereof I affix my signature, in presence of two witnesses.

CLEMENT V. SHILLINGER.

Witnesses:
FRED M. MEWING,
CURTIS D. MCKENZIE.